United States Patent
Parolari (10) Patent No.: US 8,176,377 B2
(45) Date of Patent: May 8, 2012

(54) METHOD FOR SAFELY TRANSMITTING SHORT ACK/NACK BITMAPS IN ARQ PROCESS INSIDE EDGE COMPLIANT SYSTEMS

(75) Inventor: Sergio Parolari, Milan (IT)

(73) Assignee: Nokia Siemens Networks S.p.A., Cassina de Pecchi (MI) (IT)

( * ) Notice: Subject to any disclaimer, the term of this patent is extended or adjusted under 35 U.S.C. 154(b) by 625 days.

(21) Appl. No.: 12/227,398

(22) PCT Filed: May 15, 2007

(86) PCT No.: PCT/EP2007/004303
§ 371 (c)(1),
(2), (4) Date: May 22, 2009

(87) PCT Pub. No.: WO2007/131768
PCT Pub. Date: Nov. 22, 2007

(65) Prior Publication Data
US 2010/0011273 A1    Jan. 14, 2010

(30) Foreign Application Priority Data
May 16, 2006    (EP) .................................... 06425330

(51) Int. Cl.
*H04L 1/18* (2006.01)
(52) U.S. Cl. .......................... 714/749; 714/774; 370/230
(58) Field of Classification Search .................. 714/774, 714/749; 370/230
See application file for complete search history.

(56) References Cited

U.S. PATENT DOCUMENTS

| | | | |
|---|---|---|---|
| 5,828,677 A * | 10/1998 | Sayeed et al. .................. | 714/774 |
| 6,772,215 B1 | 8/2004 | Rathonyi et al. | |
| 6,975,582 B1 * | 12/2005 | Karabinis et al. ............. | 370/204 |
| 7,000,174 B2 * | 2/2006 | Mantha et al. ................ | 714/790 |
| 7,430,190 B2 * | 9/2008 | Luo et al. ...................... | 370/334 |
| 7,539,122 B2 * | 5/2009 | Agin et al. .................... | 370/204 |
| 2003/0126551 A1 * | 7/2003 | Mantha et al. ................ | 714/790 |

(Continued)

FOREIGN PATENT DOCUMENTS

EP    0 938 207 A2    8/1999

(Continued)

OTHER PUBLICATIONS

International Search Report for Application No. PCT/EP20078/004303; mailed Aug. 16, 2007.

*Primary Examiner* — M. Mujtaba K Chaudry
(74) *Attorney, Agent, or Firm* — Staas & Halsey LLP (57) ABSTRACT

A fast ARQ mechanism operated inside 3GPP GERAN mobile radio systems uses short bitmaps, spanning only few octets, in the header of a RLC/MAC block conveying relevant ACK/NACK signalling that is transmitted either in the uplink or downlink direction, indifferently. This short bitmap which may request synchronization between transmitting and receiving frames, is encoded together with the header using coding which is more robust than that used for payload. Correct retransmission of badly received radio blocks is based on the number of RLC/MAC block periods between the instant of transmission of a radio block and the instant of reception of the short bitmap. In addition, the short bitmap is allocated in a new zone placed immediately after the header of the RLC/MAC blocks, and encoded independently of the payload using a more robust coding against the errors than the robustness of the MCS used in the payload data part.

6 Claims, 6 Drawing Sheets

U.S. PATENT DOCUMENTS

| | | | |
|---|---|---|---|
| 2004/0153706 A1 | 8/2004 | Cayla | |
| 2005/0163046 A1* | 7/2005 | Koponen et al. | 370/229 |
| 2006/0048034 A1* | 3/2006 | Cho | 714/749 |
| 2006/0184854 A1* | 8/2006 | Ihm et al. | 714/749 |
| 2008/0165713 A1* | 7/2008 | Nishibayashi et al. | 370/310 |

FOREIGN PATENT DOCUMENTS

| | | |
|---|---|---|
| EP | 0 996 248 A1 | 4/2000 |
| EP | 1 465 371 A1 | 10/2004 |
| EP | 1 625 520 A1 | 2/2006 |

* cited by examiner

MAC / RLC BLOCKS – KNOWN ART

Fig. 1

UPLINK RLC DATA BLOCK – KNOWN ART

Fig. 2

SHORT BITMAP CODING RULES – KNOWN ART

| | |
|---|---|
| 0 0 | • failed header decoding;<br>• header correctly received but with a different DL TFI;<br>• header correctly received (with the correct DL TFI) but failed decoding of the payload of the RLC block (or blocks, in case of MCS 7, 8, 9). |
| 0 1 | header correctly received (with the correct DL TFI), failed decoding of the first RLC data block, correct decoding of the second RLC data block. |
| 1 0 | header correctly received (with the correct DL TFI), correct decoding of the first RLC data block, failed decoding of the second RLC data block. |
| 1 1 | correct decoding of the payload of the RLC block, or correct decoding of both the first and second RLC data blocks. |

Fig. 3

MODIFIED RLC / MAC BLOCKS

UL/DL
Fig. 6

DL only
Fig. 7

DL only
Fig. 8

UL only
Fig. 9

EGPRS Downlink RLC/MAC header for MCS-7, 8, 9

Fig. 10

Short Bitmap reporting 20 ms observation window
(8 TSs fully allocated)

EGPRS Uplink RLC/MAC header for MCS-7, 8, 9

Fig. 11

Short Bitmap reporting 20 ms observation window
(8 TSs fully allocated)

Fig. 12

METHOD FOR SAFELY TRANSMITTING SHORT ACK/NACK BITMAPS IN ARQ PROCESS INSIDE EDGE COMPLIANT SYSTEMS

CROSS REFERENCE TO RELATED APPLICATIONS

This application is based on and hereby claims priority to European Application No. 06425330.5 filed on 16 May 2006, the contents of which are hereby incorporated by reference.

BACKGROUND

The method described below relates to the field of packet data transmission inside mobile radio networks, and more precisely to a method for safely UL/DL transmitting short ACK/NACK bitmaps in ARQ process inside EDGE compliant systems (used acronyms are given at the end of the description).

ARQ signalling by so called "acknowledge" (ACK) and "not acknowledge" (NACK) signals is usual in telecommunication protocols. Such kind of ACK/NACK signalling is described, for example, in 3GPP TS 44.060 V7.3.0 (ex GERAN 04.60). Within EDGE there are nine MCSs, known as: MCS1, . . . , MCS9.

Figure 1:
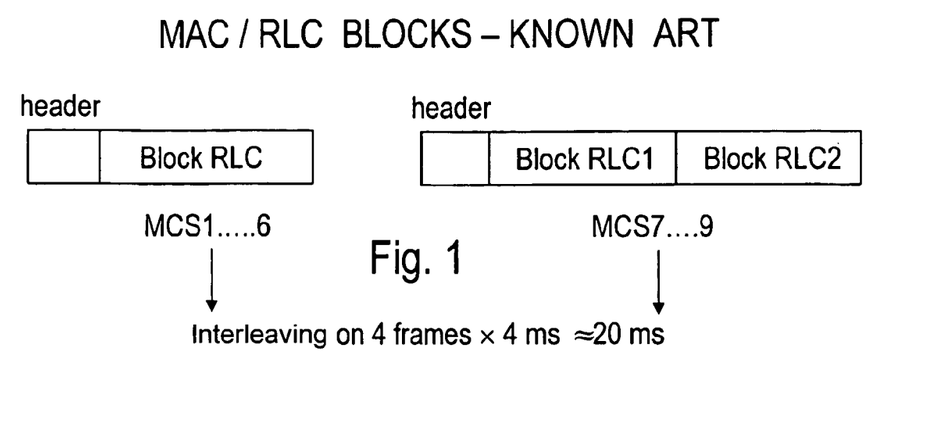
FIG. 1, already described, is a block diagram of the general structure of two types of radio blocks used within a GERAN system of the known art.

In FIG. 1 a first type of GERAN data block has a first field as "header" and a second field as "payload", The header includes both BSN and TFI fields. The latter is also designated as "RLC block". MCS 1 to MCS6 coded blocks are characterized by these two fields. For MCS7 to MCS9 coded blocks three fields are used, a first field for the header, a second field for payload, known as "block RLC1", and a third field also for payload, known as "block RLC2". The header includes the TFI, a first BSN1 field assigned to the block RLC1, and a second BSN2 field assigned to the block RLC2.

The RLC ARQ functions available in GERAN support three modes of operation: RLC acknowledged mode, RLC unacknowledged mode and RLC non-persistent mode. RLC acknowledged mode operation uses retransmission of RLC data blocks to achieve high reliability. RLC unacknowledged mode operation does not utilize retransmission of RLC data blocks. RLC non-persistent mode operation uses non-exhaustive retransmission of RLC data blocks.

Known ARQ with ACK/NACK feedback messages, such as PDAN or PUAN, reports bitmaps which occupy a whole radio block. Whenever there is a polling request transmitted in downlink (DL) direction by the base station for receiving back a PDAN message transmitted by the mobile in uplink (UL) direction to either acknowledge or not acknowledge RLC blocks received in downlink, uplink resources are used only for sending the uplink signalling message PDAN. These uplink resources therefore can not be used for sending data. Dual conclusions for waste of downlink resources should be drawn for a PUAN message issued by the base station in downlink to either acknowledge or not acknowledge RLC blocks transmitted by the MS in uplink. In consequence of above, the data transmission might be severely hurt by frequently transmitted ACK/NACK messages, especially in case of transmission over few timeslots.

EP-A-1465371 discloses a flexible polling method that is used by the network to request an ACK/NACK bitmap from a UE. The RLC/MAC header of a block is coded separately from the data.

European patent application No. 05023668.6, filed on Oct. 28, 2005 in the name of the same Applicant discloses a "method to ACK/NACK signalization" which has to be considered under the Article 54(3) EPC. According to the relevant citation:

A first unit (BS) transmits a polling request at a point of time to the second unit (MS) and the polling request initializes an ACK/NACK examination of received RLC blocks there. The second unit examines received RLC blocks, which are assigned to a dedicated timeslot number of the carrier, and the examination is done for all timeslots of the set.

During the examination one binary bit is used to indicate, if a considered RLC block shows errors or not. The indicating bits are used to form a short bitmap and the short bitmap is transmitted from the second unit to the first unit as ACK/NACK signal.

The first unit analyses the short bitmap and identifies erroneous RLC blocks with respect to the transmission timing of the RLC blocks between the first and the second unit, with respect to the assigned set of timeslots and with respect to the point of time the polling request was sent, each of that facts being known at the first unit.

Figure 2:
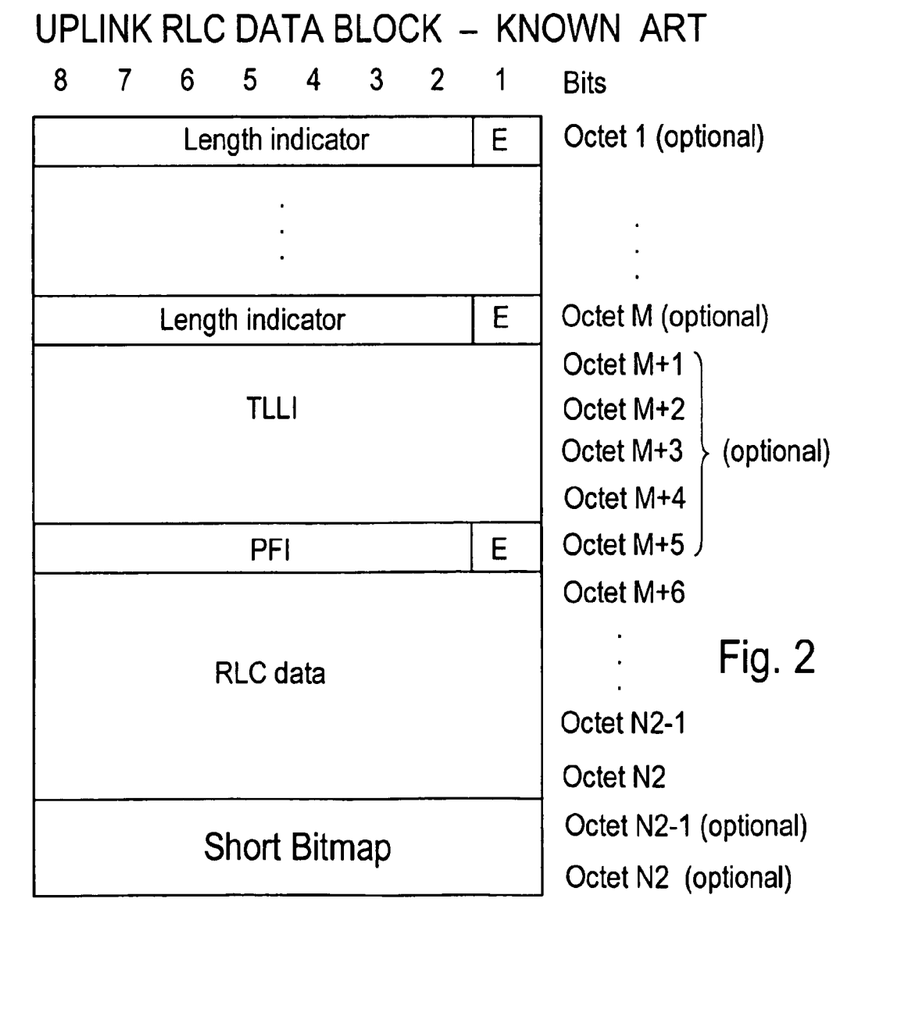
FIG. 2, already described, is a block diagram of an exemplary structure of a RLC data block of the related art used in uplink direction.

In case of data transmission in uplink direction, the short bitmap will be part of a "normal" uplink data block. Because of this, there is the possibility to add and transmit normal payload within the data block, altogether with the short bitmap block. This feature is present in the uplink RLC block of FIG. 2.

If there is no data transmission in uplink direction the short bitmap will be sent in uplink direction in a so called "access burst". The transmission and the reception of that kind of burst is normally done without disturbance, the transmission of the short bitmap is therefore save. If the access burst carries the short bitmap then battery power at the mobile station can be saved. Because of the slower transmission repetition of the access burst it is possible to reduce interference within the system/GERAN system.

Under the cited method the transmission of block sequence numbers as part of the ACK/NACK signal is not needed. Instead of a block sequence number based ACK/NACK reporting, a time based reporting is used. The base station, and hence the mobile station, knows the transmission time and the timing of a dedicated radio block exactly, so the assignment of a received ACK/NACK indication to a formerly sent radio block is possible. For example, if a polling indication is received at a frame number N, the MS would send back a short bitmap for ACK/NACK, indicating the status of all received radio blocks in assigned timeslots during frame number N, N−1, and so on. This is depending on the size of the short bitmap and of the number of assigned timeslots. In most cases a very short bitmap is sufficient for ACK/NACK signalling. If we assume a mobile station with 4 assigned timeslots in downlink direction and a polling period of 40 ms, there will be a maximum of 4×2=8 radio blocks carrying a maximum of 16 RLC blocks submitted during two successive polling.

Figure 3:
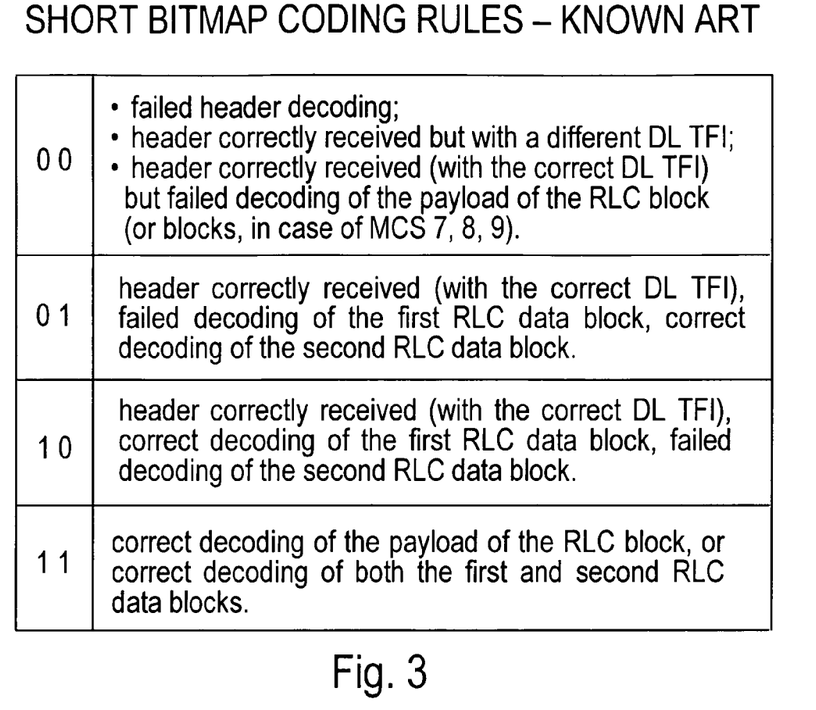
FIG. 3, already described, is a table illustrating the coding rules used to build up a short bitmap included in the data part of the RLC data block of FIG. 2.

Since there might be two RLC data blocks per radio block (in case of MCS 7, 8, 9), at most two bits per radio block are needed in the bitmap. For every radio block received in the assigned timeslots, the receiver shall set the pair of bits in the short bitmap as described by the coding rule table of the citation shown in FIG. 3.

Figure 4:
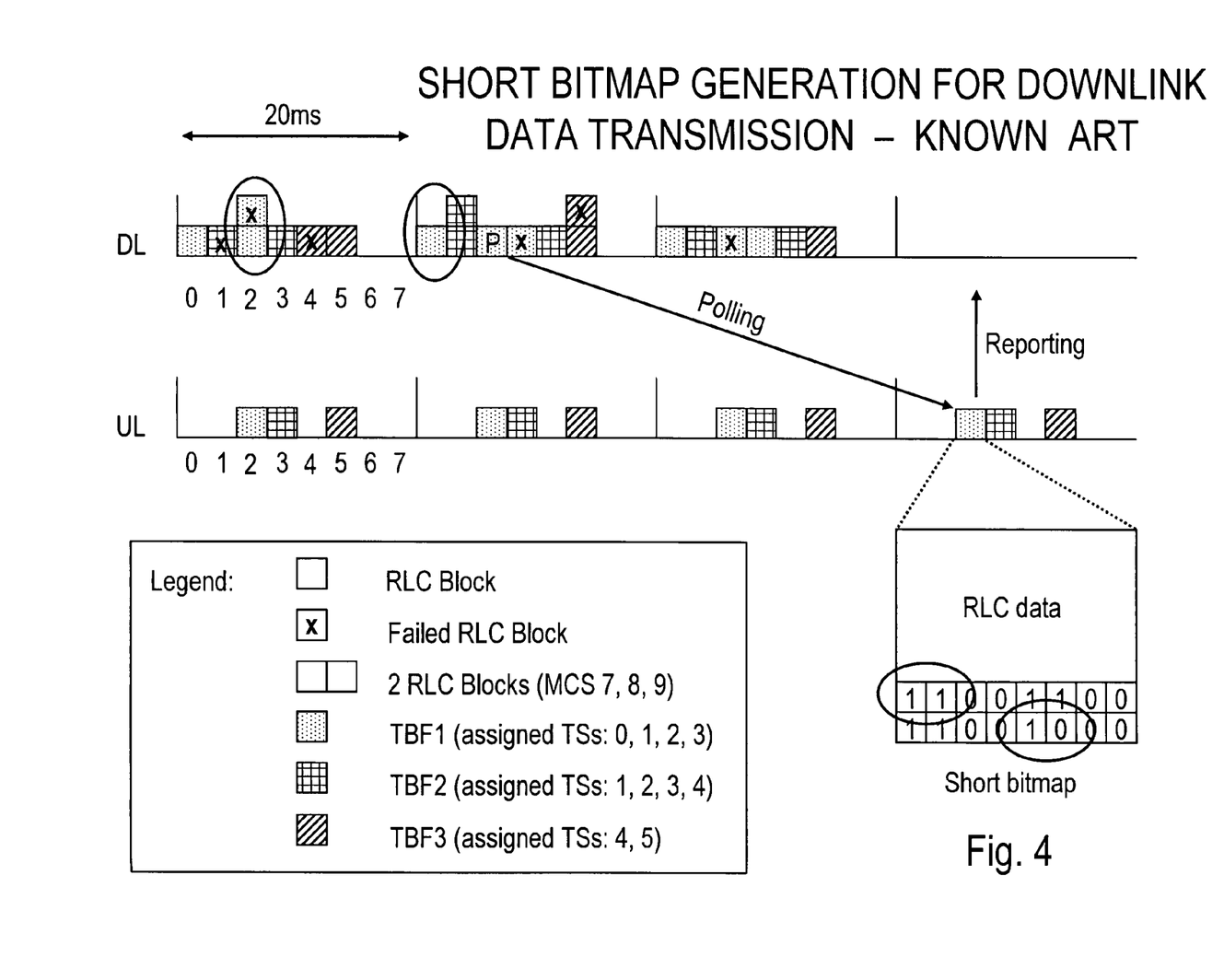
FIG. 4, already described, is a block diagram of the Polling/Reporting ACK/NACK ARQ signalling mechanism implemented for uplink reporting with short bitmaps inside a GERAN system of the known art.

In case of multiple TBFs allocated to the same mobile, the bitmap could encompass the information for all TBFs. In this case bits would be set to 1 for RLC blocks correctly received with any of the assigned DL TFIs. This would further optimize the procedure since feedback for all the TBFs could be provided at the same time. FIG. 4 shows how the coding rules of FIG. 3 apply for the generation of a short bitmap. In the figure a DL TBF is allocated on timeslots 0, 1, 2 & 3 (TBF1) and time multiplexed with other TBFs (TBF2 and TBF3) allocated on the same carrier as TBF1. The length of the short bitmap (relevant to the only TBF1) is assumed to be of 2 octets (sequentially read) each one spanning the 20 ms period of a radio block. As the polling is received by the MS in frame N, the first pair of circled bits in the short bitmap shall refer to the radio block received on the first assigned timeslot of frame N, the second pair of bits shall refer to the radio block received on the second assigned timeslot of frame N, etc. Because there is still free space in the bitmap, the next pair of bit shall refer to the radio block received on the first assigned timeslot of frame N−1 and so on.

The method of the cited application can be used for ACK/NACK reporting both for uplink or downlink transmissions, indifferently, although PDAN message is the only one described described below. The instant of the PDAN transmission is scheduled by the base station with a polling request (RRBP) issued in the header of a RLC block transmitted in downlink. There are no reasons for a mobile to poll the network (base station) for transmitting a feedback for its own uplink transmissions, because the network is the master of the scheduling on the downlink channel. Starting from the fast ACK/NACK uplink reporting for downlink transmissions, some other questions have to be considered in order to adapt the faster MAC protocol to the uplink data transmissions. First of all, a criterion must be implemented to inform the mobile that a short bitmap is used instead of traditional extended one with a PUAN message.

The method of the cited application indicates a criterion of coexistence between extended and short bitmaps valid for the only ACK/NACK reporting set in uplink direction. The criterion avails of a substantial redefinition of both known RRBP and ES/P fields in the headers of the EGPRS downlink data blocks. Besides, in order for the base station receiver to know whether or not a short ACK/NACK bitmap is piggybacked in the RLC uplink data block, a spare bit in the UL RLC/MAC header is used. A spare bit exists in all three EGPRS UL header types and will be used for this case.

The gap for downlink reporting is filled up by the temporary 3GPP document TSG GERAN#29, Tdoc GP-060755, San Jose Del Cabo, Mexico, 24-28 Apr. 2006 which suggests:
ACK/NACK reporting set in uplink direction:
   The spare bit in the UL RLC/MAC header is used. Reporting from the mobile of either short or extended bitmap is signalled by the network by using the poll (RRBP) and USF fields in the downlink direction.
ACK/NACK reporting set in downlink direction:
   The spare bit in the DL RLC/MAC header is used. The same criterion of the cited application for ACK/NACK reporting in uplink direction is used for downlink reporting. To say, both RRBP and ES/P fields in the header of the EGPRS downlink data blocks are redefined for this aim.

The ACK/NACK reporting as it results from the combined teaching of both the priority documents is nevertheless not optimal for the following reasons:
   A residual possibility of error exists even decoding the short bitmap with separate CRC. This mainly depends on the MCS adaptively selected for payload and hence for the included short bitmap.
   A too rigid mechanism for ACK/NACK reporting in downlink direction which considers reporting for a single TBF only, without considering the eventuality of additional reports from other MSs sharing the same timeslots inside the predetermined reporting window.

SUMMARY

In view of the highlighted state of the art, an aspect is to provide a method without the underlined limitations.

The method safely transmits back to a first unit short ACK/NACK bitmaps generated by a second unit in ARQ signalling context inside a mobile radio system, wherein the transmissions scheduled for a temporary block flow, called TBF, avails of at least a carrier accessed in time division during timeslots of sequential frames for conveying RLC/MAC radio blocks each having a header and a payload data part distributed on a set of allocated timeslots interleaved between a predetermined number of frames, wherein the short ACK/NACK bitmap includes as many bits as the RLC/MAC blocks received in a time window spanning one or more predetermined block periods before a starting point of time known to the first and the second unit, the logical value of each bit indicating errored or correctly decoded RLC/MAC blocks, so as to enable retransmission by the first unit of those blocks mapped as erroneously decoded by the second unit; the short bitmap being encoded by the second unit independently of the redundancy code of the payload data part, using a modulation and coding scheme for the short bitmap generally more robust against the errors than the robustness of the modulation and coding scheme used in the payload data part.

According to a first embodiment valid for both uplink and downlink reporting, the short bitmap is allocated in the header of the RLC/MAC block used for conveying it, so as to be encoded with the header.

According to a second embodiment valid for the downlink reporting only, the short bitmap allocated in the header is further allocated in a new zone of the RLC/MAC block independently encoded with respect of both the header and data part; the new zone carries broadcast or multicast information which is accessed by all the mobile stations allocated on the same timeslots. Profitably the new zone is placed immediately after the header part.

According to a third embodiment valid for short bitmaps transmitted in the downlink, the short bitmap is allocated only in the new broadcast/multicast zone.

According to a fourth embodiment valid for the uplink reporting, the short bitmap is allocated not in the header nor in the payload but in a new additional zone.

The method, independently of the used embodiment, makes the transmission of short ACK/NACK bitmaps in the ARQ process more reliable. The method implemented in accordance with the second or the third embodiment, is better in agreement with the broadcast/multicast opportunity offered on the downlink channel with respect to the point-to-point transmission in the uplink. Profitably, a short bitmap allocated in the broadcast/multicast zone accounts for more than one user scheduled on the same time window, even different from the addressee of the payload of the radio block. The advantage is that all mobiles scheduled inside the same block period can be equally quickly informed on the ACK/NACK status of their recent transmissions.

The method implemented in accordance with the fourth embodiment allows a more reliable solution than allocating the bitmap in the payload, because the coding of the new zone can be made more robust, and more flexible than the first embodiment, because the short bitmap can be avoided when not needed, so that data can be sent in the uplink.

In conclusion, a reliable fast feedback mechanism can be realized sending back to the transmitter a feedback information at every possible occasion, without completely consuming the bandwidth on the feedback channel. This is made possible by piggybacking short bitmaps in different part of the radio blocks for both the forward and reverse links. The implementation of delay sensitive services in GERAN, like VoIP, is appreciably improved.

BRIEF DESCRIPTION OF THE DRAWINGS

These and other aspects and advantages will become more apparent and more readily appreciated from the following description of an exemplary embodiment, taken in conjunction with the accompanying drawings given for purely non-limiting explanatory purposes and wherein.

DETAILED DESCRIPTION OF AN EMBODIMENT

Reference will now be made in detail to the exemplary embodiments which are illustrated in the accompanying drawings, wherein like reference numerals refer to like elements throughout.

Figure 5:
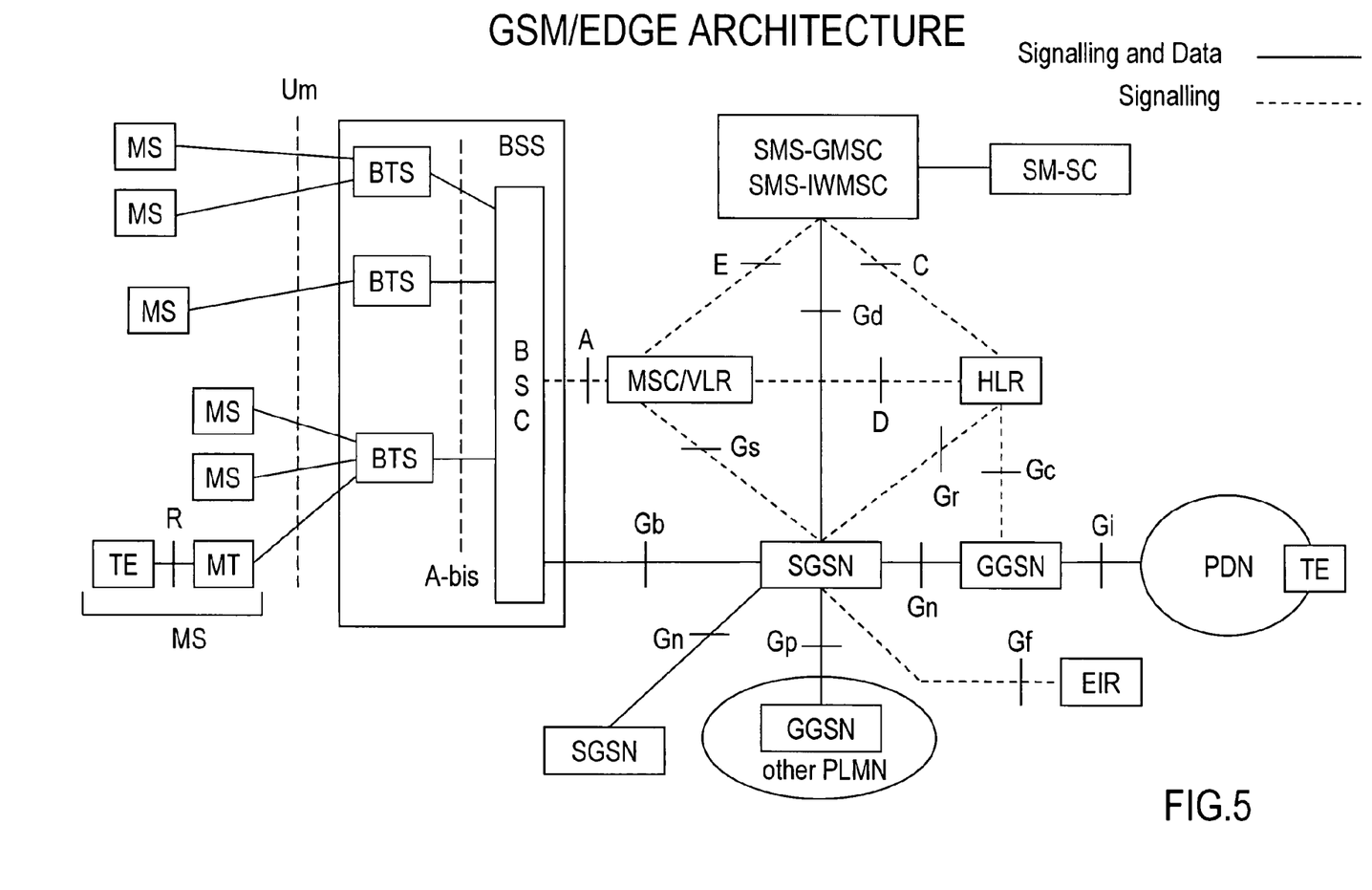
FIG. 5 is a block diagram of the functional architecture of a GSM/EDGE network suitable to implement a RLC/MAC protocol modified as per the method.

With reference to FIG. 5, the depicted GSM/EDGE functional architecture includes the following functional blocks: MSs (TE and MT), BSS (both BTSs and BSC), SGSN, GGSN, EIR, MSCNLR, HLR, SMS-GMSC, SMS-IWMSC, and SM-SC. Inside the MS the first functional block TE is connected to the second functional block MT through a connection indicated by a Reference point R, typically supporting a standard serial interface. The following interfaces are foreseen: Um, A-bis, A, Gb, Gi, Gp, Gn, Gp, Gf, Gs, Gr, Gd, D, E, C, whose connectivity between the relevant blocks are directly visible in the figure.

Every MS (MT) is connected to its serving BTS through the Um radio interface for exchanging voice and data services and the relevant signalling. The BSS includes a plurality of BTS connected to a BSC through a respective A-bis interface. The BSC is connected to the core network, mainly including MSC and SGSN, through the A and Gb interfaces accounting for circuit switched domain (CS) and packet switched domain (PS), respectively. Former BSSs are evolved in GERANs in order to allow higher data throughputs and incremental redundancy when erroneous data blocks are retransmitted. Furthermore, the Gn interface connects two GSN nodes in the same PLMN system, while the Gp interface connects two GSN nodes belonging to different PLMN systems.

In operation, at the Um and A-bis interfaces several protocols are stacked upon the physical layer, in particular: SNDCP, LLC, RLC, and MAC. The SNDCP protocol controls the transfer of network protocol units (N-PDUs) between the MS mobile and SGSN node. The main functions of the SNDCP protocol are:

Multiplexing of packet data protocols, for instance IP.
Compression/decompression of the user data packets.
Compression/decompression of the protocol control information.
Segmentation of NPDUs within LLC frames and re-assembly of the LLC frames the NPDUs.

To carry out these functions the SNDCP protocol avails of a NSAPI to identify in the MS mobile the access point to a packet data protocol PDP, while in SGSN and GGSN nodes it identifies the context associated to an address of the above mentioned PDP protocol.

The RLC gives a reliable radio link and maps the LLC frames within the physical GSM channels. The RLC/MAC avails of the following GPRS channels: PBCCH, PCCCH, PACCH, and PDTCH conveyed on PDCH. The RLC/MAC packet is mapped on radio blocks of the GSM multiframe. A radio block is transported by four consecutive Normal bursts. At physical layer the four Normal bursts are interleaved on four consecutive TDMA frames of 4,615 ms duration. The physical link layer protocol is responsible for FEC block code enabling error detection and correction at the receiver. Four convolutional coding schemes (CS-1, . . . CS4) are foreseen for the GPRS, and nine modulation and coding schemes (CS-1, . . . CS9) for the EGPRS, generating different bitrates.

Signalling procedures for accessing the radio channel are controlled by MAC, which also governs dynamic allocation of the resources (request and grant). Dynamic allocation means that a particular transmission resource, consisting for instance of a PDCH channel on a physical timeslot, is made time division shareable among more MS mobiles, each of them being engaged in an active session of data transfer, or signalling, through the same transmission resource jointly assigned. To the specific aim of dynamic allocation, the BSC includes a PCU implementing a proprietary scheduling algorithm.

The sub-set of MAC procedures governing the multiplexing of the transmissions on the shared channels, provide the MS with temporary assignment of resources, called TBFs, on the physical layer to sustain the single transmission. A TBF may include memory buffer to house the queues of RLC/MAC blocks. Each TBF assignment enables the unidirectional transfer of radio blocks (for payload data and signalling) within a cell between the network and a mobile station MS, or vice versa. Control messages for the establishment/abatement of a connection between service points and the allocation/de-allocation of relevant supported physical resources, for instance the TBF buffers, contemplate different opportunities capable of covering the whole survey foreseen in the packet transfer mode of the RR sublayer. For simplicity, it is here described a very limited survey of establishment/abatement of TBF connections and of the relevant operation modes. We can start from the establishment of a TBF uplink connection following a Packet Transfer originated by the mobile. In this case the mobile requires the assignment of a GPRS channel sending a PACKET CHANNEL REQUEST message including the TBF resources requested for the transfer of packets to the network. In case of reception, the network replies with a PACKET UPLINK ASSIGNMENT message on the control channel allocating to the mobile the resources requested for the uplink transfer of packets. The resources include one or more PDCH channels, i.e. at least a carrier and a timeslot, and a TFI value. The network does not assign any buffer in uplink direction (the buffer resides in the mobile). The network requires simply knowing the number of blocks that a MS mobile intends to transmit. We can now proceed examining the assignment of a TBF downlink following a Packet Transfer ended towards the mobile. In this case at the end of the paging procedure, the network sends to the mobile a PACKET DOWNLINK ASSIGNMENT message in the Ready state on the control channel, with enclosed the list of PDCH channels allocated for the downlink transfer. A buffer, relevant to the downlink TBF, is purposely allocated to contain the RLC/MAC blocks to be sent.

In the majority of the cases a TBF is kept alive only for the transfer of one or more LLC protocol units, to the right purpose of transferring the corresponding RLC/MAC blocks. The network assigns to each TBF its own temporary identifier, called TFI (Temporary Flow Identity). The mobile shall assume that the TFI value is unique among TBF competitors in each direction, uplink or downlink. A RLC/MAC data block is identified to the TBF to which it is associated through its own field where the identifier TFI is written, and another field to indicate the uplink or downlink direction of the block. Should the RLC/MAC block be referred to a control message, a field is foreseen to indicate the message transmission direction and type. In the case of dynamic allocation, the header of each RLC/MAC block transmitted on a PDCH channel in "downlink" direction includes an additional field called USF, which is used by the network in the form of a flag to control the time division multiplexing of different mobile stations on a physical channel PDCH in uplink direction. We can now better qualify the already mentioned PACKET UPLINK ASSIGNMENT message, sent by the network towards the mobiles, stating that it includes: the identifier TFI of the downlink/TBF buffer containing the control block carrying this message, the list of the allocated PDCH channels (time slots), and a corresponding USF value for each allocated channel (timeslot). One USF is scheduled for the transmission of one radio block. Three bits are foreseen for the USF field that enable to unambiguously discriminate up to eight users sharing a time-slot, also in the borderline case in which the single TBF buffer are associated all the eight time slots of a TDMA frame.

According to 3GPP TS 44.060 V7.3.0, subclause 9.1.8.1, the Packet ACK/NACK message contains a starting sequence number (SSN) and a received block bitmap (RBB). The Packet ACK/NACK message is sent by the RLC receiver and is received by the RLC transmitter. The SSN and RBB are determined as defined in this sub-clause and transmitted in RLC acknowledged, RLC unacknowledged and RLC non-persistent modes. The SSN and RBB may be ignored by the RLC transmitter in unacknowledged mode. The RBB is defined as a binary valued array of WS elements, where the index of each element takes value 0, 1, 2, . . . WS−1 in the given order, respectively. The BSN values specified in the RBB are interpreted by subtracting the bit position in the bitmap from the starting sequence number (SSN) modulo SNS.

The presence of the reporting with small bitmaps can be communicated by the network to the mobiles through the System Information broadcast on the Common Channel read by the mobiles periodically, or alternatively by a dedicated information element during the establishment of a new TBF. Legacy polling is still needed in order to support legacy MSs and LQC purposes for mobile that support fast Ack/Nack reporting. The result would be a substantially reduced legacy polling repetition rate being applied for MSs that support fast Ack/Nack reporting compared to MSs that only support the legacy Packet Ack/Nack reporting scheme. The repetition rate of the legacy polling need also to be chosen to cater for the case when the short bitmap moves outside the short bit map window with errors.

For the coexistence between fast and extended legacy reporting we need to consider: a) ACK/NACK reporting sent in uplink direction; b) ACK/NACK reporting sent in downlink direction.

Case a)—ACK/NACK reporting sent in uplink direction. The objective is to keep the network in control of how often an MS is allowed to send ACK/NACK reports. The reporting is commanded using the poll (RRBP) and USF fields in the downlink direction as described in GP-060755-AnnexA, subclause 10.2.1.5.2 already mentioned in the introduction.

Case b)—ACK/NACK reporting sent in downlink direction. In order for the mobile station to determine that a short ACK/NACK report is included in the data block, the receiver needs to know this, if possible without any double decoding. A redefinition of the RRBP and ES/P fields in the header of the EGPRS DL data blocks can be utilized as described in GP-060755-AnnexA, subclause 10.2.1.5.3 already mentioned in the introduction.

Figure 6:
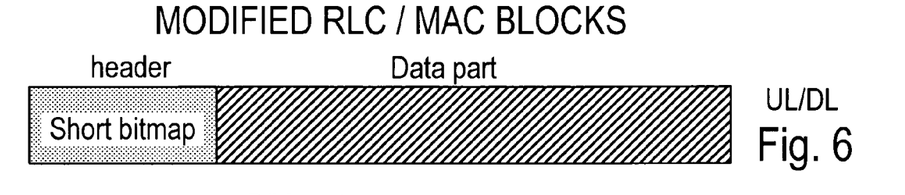
FIGS. 6 to 12 are block diagrams of the structure of some exemplary RLC/MAC blocks modified as per the method.
Figure 10:
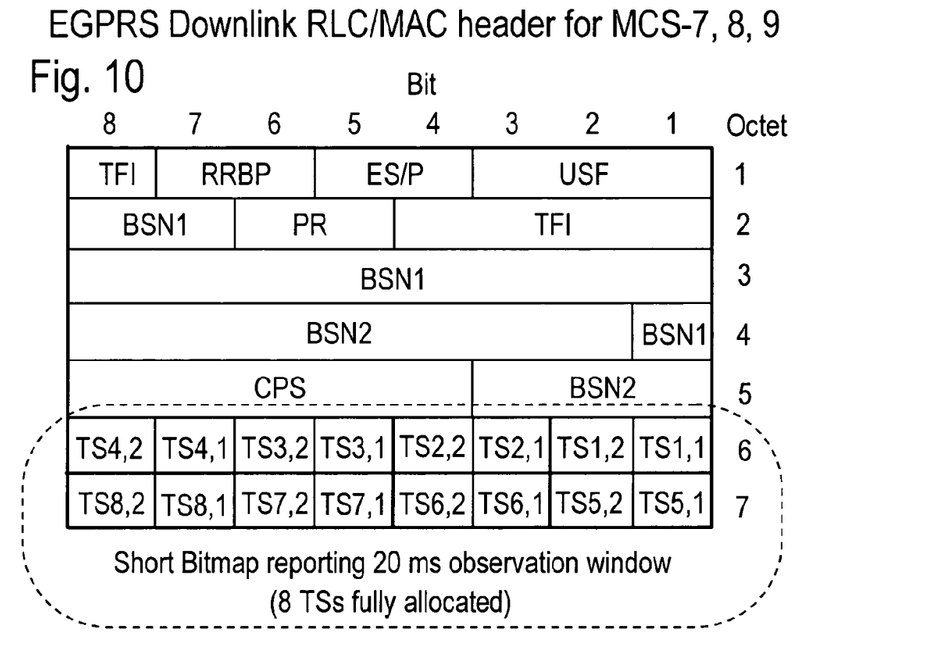
Figure 11:
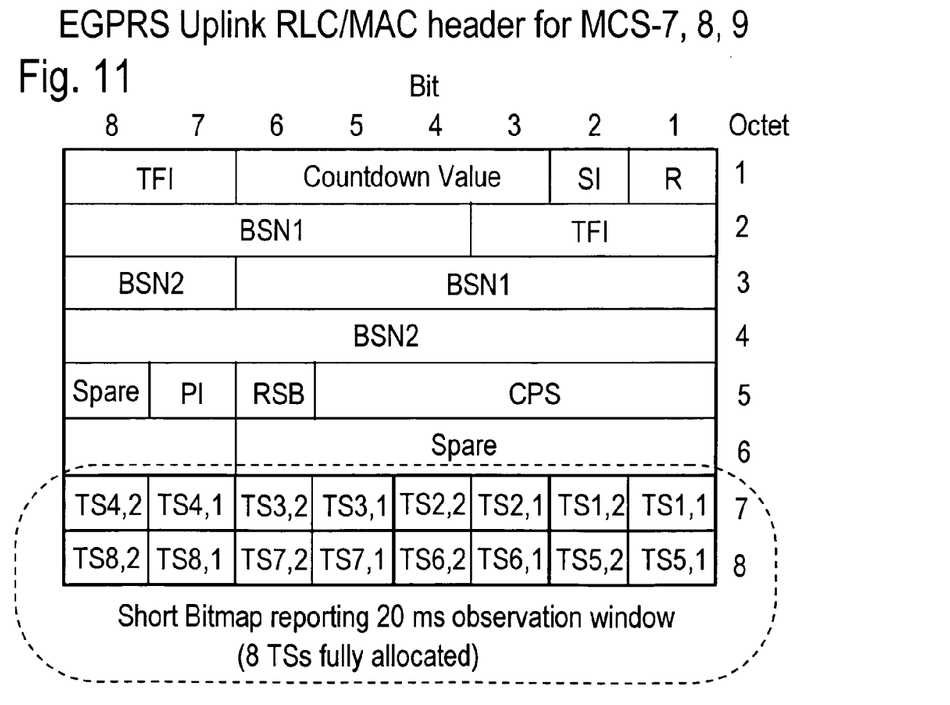

With reference to FIG. 6, we see a new UL/DL RLC/MAC block structure modified so as to include a short bitmap in the header. The detail of the new header for an EGPRS downlink block is reported in FIG. 10 while for an EGPRS uplink block is reported in FIG. 11, the fields other than the short bitmap are described in 3GPP TS 44.060 V7.3.0. The short bitmap is completed using the coding rules reported in the table of FIG. 3. Synchronization between transmission and reception is needed to implement the retransmission based on short bitmaps rather than asynchronous BSNs. The minimum reserved room of two octets accounts for the maximum number of scheduled blocks inside the latest single 20 ms time window, to say two EGPRS RLC data blocks for each of the eight timeslots of the frame. The label TS1,1 means EGPRS RLC data block 1 on timeslot 1, and so on. Further room can be provided in the header to extend the reporting window. In this case, two octets can be added up for each additional 20 ms observation period. Alternatively, the room reserved in the header for the short bitmap is the only one effectively needed on the basis of the actual scheduling.

Figure 7:
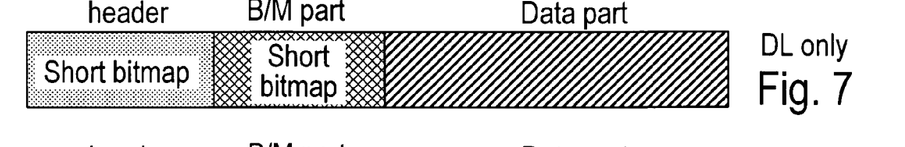

In FIG. 7 we see the structure of a new downlink RLC/MAC block, modified so as to include a short bitmap in the header and also in a new broadcast/multicast (B/M) zone, profitably allocated between the header and the data part.

Figure 8:
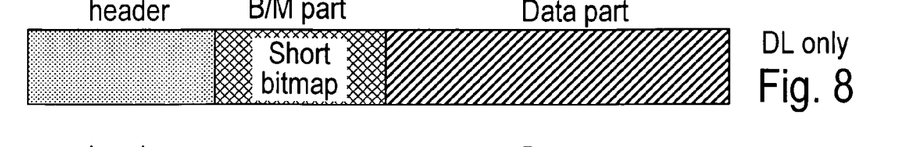

In FIG. 8 the short bitmap is allocated only in the B/M zone of the downlink RLC/MAC block. The block structure represented in FIG. 8 is detailed in FIG. 12.

Figure 9:
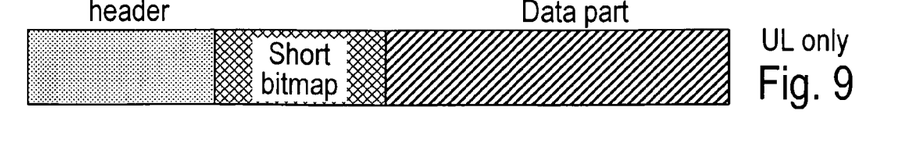

In FIG. 9 we see the structure of a new uplink RLC/MAC block, modified so as to include a short bitmap in a new zone, profitably allocated between the header and the data part.

In operation, which type of downlink RLC/MAC block visible in FIG. 7 and FIG. 8 for conveying the short bitmap is communicated by the network to the MSs. For all types of new RLC/MAC block containing the short bitmap in the new zone as in the FIGS. 7 to 9, the length of the new zone is communicated in the header of the RLC/MAC block.

Figure 12:
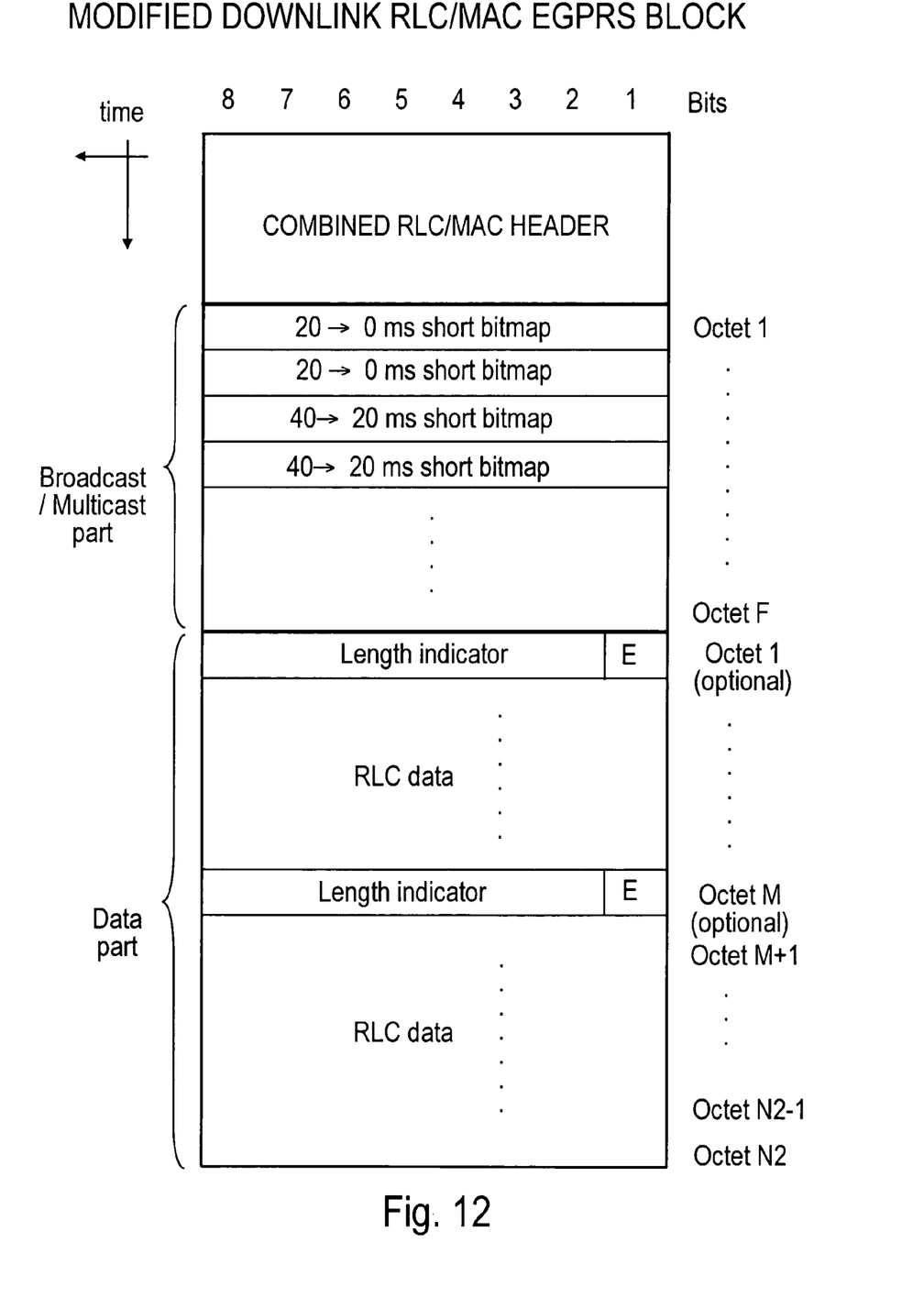

With reference to FIG. 12 the base station prepares a short bitmap providing feedback for all the TBFs of all the mobile stations allocated on the same timeslots, for a reporting window of one or more block periods. The knowledge of the fixed delay between the earliest uplink radio block considered in the reporting window and the actual radio block which conveys the B/M part, automatically enables the mobiles to retransmit the errored radio blocks mapped in the ACK/NACK signalling received back, starting from the earliest one. The B/M zone is encoded more robustly than the robustness used for adaptively encoding the remaining data part. Considered that the B/M zone between the header and the data part already contains the ACK/NACK information for all the TBFs, the short bitmap included in the header of downlink RLC/MAC block of FIG. 7 can be reduced or eliminated.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

On the basis of the above description some changes may be introduced in the exemplary embodiment by the skilled in the art without departing from the scope of the invention. It is thus contemplated that the present invention encompasses any and all such embodiments covered by the following claims. Thus, it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

Used Acronyms
3GPP—3$^{rd}$ Generation Partnership Program
ACK—Acknowledge (mode)
ARQ—Automatic Repeat reQuest
BCCH—Broadcast Control Channel
BS—Base Station
BSC—Base Station Controller
BSN—Block Sequence Number
BSS—Base Station Subsystem
BTS—Base Transceiver Station
CCCH—Common Control Channel
CRC—Cyclic Redundancy Check
CS—Circuit Switched
  Coding Scheme
DL—Downlink
E—Extension bit
EDGE—Enhanced Data rates for GSM Evolution
EGPRS—Enhanced GPRS
ES/P—Extended/Supplementary Polling
FACCH—Fast Associated Control Channel
FPB—First Partial Bitmap
GERAN—GSM/EDGE Radio Access Network
GGSN—Gateway GSN
GMSC—Gateway MSC
GPRS—General Packet Radio Service
GSM—Global System for Mobile communications
IP—Internet Protocol
IWMSC—InterWorking MSC
LI—Length Indicator
LLC—Logical Link Control
LQC—Link Quality Control
MAC—Medium Access Protocol
MBMS—Multimedia Broadcast Multicast Service
MCS—Modulation and Coding Scheme
MS—Mobile Station
MSC—Message Switching Centre
MT—Mobile Terminated
NACK—Not Acknowledge (mode)
NPB—Next Partial Bitmap
NPDU—Network PDU
NSAPI—Network SAPI
PACCH—Packet Associated Control Channel
PBCCH—Packet Broadcast Control Channel
PCCCH—Packet Common Control Channel
PCU—Packet Control Unit
PDAN—Packet Downlink ACK/NACK
PDTCH—Packet Data Traffic Channel
PDCH—Packet Data Channel
PDU—Protocol Data Unit
PFI—Packet Flow Identifier
PLMN—Public Land Mobile Network
PS—Packet Switched
PUAN—Packet UplinkACK/NACK
RAN—Radio Access Network
RBB—Received Block Bitmap
RLC—Radio Link Control
RRBP—Relative Reserved Block Period
RTT—Round Trip Time
RTTI—Reduced TTI
SAPI—Service Access Point Identifier
SGSN—Service GPRS Support Node
SMS—Short Message Service
SNS—Sequence Number Space
SNDCP—Subnetwork Dependent Convergence Protocol
TBF—Temporary Block Flow
TFI—TBF identifier
TLLI—Temporary Logical Link Indicator
TTI—Transmit Time Interval
UL—Uplink
USF—Uplink State Flag
VLR—Visitor Location Register
VoIP—Voice over IP
WS—Window Size

The invention claimed is:

1. A method for transmitting back to at least one first unit, short ACK/NACK bitmaps generated by a second unit in an ARQ signalling context inside a mobile radio system, where the short ACK/NACK bitmaps contain less bits than extended bitmaps and transmissions thereof are scheduled for a temporary block flow and avail of at least a carrier accessed in time division during timeslots of sequential frames for conveying RLC/MAC radio blocks each having a header and a payload data part distributed on a set of allocated timeslots interleaved between a predetermined number of frames, where each short ACK/NACK bitmap includes as many bits as a received number of RLC/MAC blocks received in a time window spanning at least one predetermined block period before a starting point of time known to the at least one first unit and the second unit, a logical value of each bit indicating correctly or erroneously decoded RLC/MAC blocks to enable retransmission by the at least one first unit of those blocks mapped as erroneously decoded by the second unit, comprising:
  encoding a short ACK/NACK bitmap by the second unit independently of a redundancy code of the payload data part, using a first modulation and coding scheme for the short ACK/NACK bitmap more robust against errors than a robustness of a second modulation and coding scheme used for the payload data part; and
  allocating the short ACK/NACK bitmap into a third part of the RLC/MAC block transmitted in the downlink by the second unit, configured as a base station, towards the at least one first unit, each configured as a mobile station, the third part being independently encoded with respect to both the header and the payload data part, and being accessed by all mobile stations on the allocated timeslots.

2. The method of claim 1, further comprising communicating presence and length of the third part in the header of the RLC/MAC block.

3. The method of claim 1, further comprising providing in the third part the of the RLC/MAC block transmitted in the downlink, feedback information for all temporary block flows of all the mobile stations on the allocated timeslots for a reporting window of at least one block period.

4. A method for transmitting back in downlink to at least one mobile station a short ACK/NACK bitmap generated by a base station in an ARQ signalling context inside a mobile radio system, where the short ACK/NACK bitmap contains less bits than an extended bitmap, comprising:
   allocating the short ACK/NACK bitmap in a zone of an RLC/MAC block; and
   encoding broadcast or multicast information in the zone independently with respect to both a header and a data part of the RLC/MAC block, the broadcast or multicast information being accessible by all mobile stations allocated on defined timeslots.

5. A base station in a mobile radio system including mobile stations, comprising:
   a control unit controlling transmission, back in downlink to at least one of the mobile stations, of a short ACK/NACK bitmap generated by the base station in an ARQ signalling context inside the mobile radio system, where the short ACK/NACK bitmap contains less bits than an extended bitmap and the short ACK/NACK bitmap is allocated in a zone of an RLC/MAC block, the zone containing broadcast or multicast information for access by all the mobile stations allocated on defined timeslots and being independently encoded with respect to both a header and a data part of the RLC/MAC block.

6. A mobile station in a mobile radio system including at least one base station, comprising:
   a receiver receiving a short ACK/NACK bitmap generated by the at least one base station in an ARQ signalling context inside the mobile radio system, where the short ACK/NACK bitmap contains less bits than an extended bitmap and the short ACK/NACK bitmap is allocated in a zone of an RLC/MAC block, the zone containing broadcast or multicast information for access by all the mobile stations allocated on defined timeslots and being independently encoded with respect to both a header and a data part of the RLC/MAC block.

* * * * *

UNITED STATES PATENT AND TRADEMARK OFFICE
CERTIFICATE OF CORRECTION

PATENT NO. : 8,176,377 B2
APPLICATION NO. : 12/227398
DATED : May 8, 2012
INVENTOR(S) : Sergio Parolari It is certified that error appears in the above-identified patent and that said Letters Patent is hereby corrected as shown below:

Column 10, Line 66, In Claim 3, after "part" delete "the".

Signed and Sealed this
Thirty-first Day of July, 2012

David J. Kappos
*Director of the United States Patent and Trademark Office*